US012295434B2

(12) United States Patent
Heyd

(10) Patent No.: US 12,295,434 B2
(45) Date of Patent: May 13, 2025

(54) HAND PROTECTION DEVICE AND METHOD OF USE

(71) Applicant: Jeffrey D. Heyd, Palm Desert, CA (US)

(72) Inventor: Jeffrey D. Heyd, Palm Desert, CA (US)

( * ) Notice: Subject to any disclaimer, the term of this patent is extended or adjusted under 35 U.S.C. 154(b) by 85 days.

(21) Appl. No.: 17/978,168

(22) Filed: Oct. 31, 2022

(65) Prior Publication Data
US 2024/0138501 A1 May 2, 2024

(51) Int. Cl.
*A41D 19/00* (2006.01)
*A01K 55/00* (2006.01)
*A41D 19/015* (2006.01)

(52) U.S. Cl.
CPC .......... *A41D 19/0048* (2013.01); *A01K 55/00* (2013.01); *A41D 19/0006* (2013.01); *A41D 19/015* (2013.01)

(58) Field of Classification Search
CPC ............ A41D 19/0048; A41D 19/0006; A41D 19/01505; A41D 19/01511; A41D 19/015; A41D 19/006
See application file for complete search history.

(56) References Cited

U.S. PATENT DOCUMENTS

| | | | | |
|---|---|---|---|---|
| 1,339,129 A | * | 5/1920 | Oathout | A41D 19/0006 2/164 |
| 1,725,065 A | * | 8/1929 | Edwards | A41D 19/0065 2/168 |
| 2,028,947 A | * | 1/1936 | Palm | A41D 17/00 36/2 R |
| 2,074,390 A | * | 3/1937 | Green | A41D 19/015 449/61 |
| 2,304,137 A | * | 12/1942 | Peakes | A41D 19/015 2/164 |
| 2,344,811 A | * | 3/1944 | Gill | A42B 1/0187 2/457 |
| 3,191,185 A | * | 6/1965 | Martin | A41D 1/06 411/965 |
| 3,792,451 A | | 2/1974 | Almasi et al. | |
| 3,916,448 A | * | 11/1975 | Hamel | A41D 19/01505 2/2.5 |
| 3,918,096 A | * | 11/1975 | Lim | A41D 19/015 2/161.1 |
| 4,214,321 A | * | 7/1980 | Nuwayser | B32B 15/20 428/458 |
| 4,287,608 A | * | 9/1981 | Meyer | A41D 19/015 139/420 R |

(Continued)

*Primary Examiner* — Richale L Quinn

(57) ABSTRACT

A hand protection device for preventing bee stings includes a glove for positioning on a person's hand. The glove comprises bottom and top sections, which are positioned, upon donning of the glove, over a palm and a back of the hand, respectively, and over lower and upper portions of each finger, respectively. The top section comprises a medial layer positioned between an inner layer and an outer layer wherein the inner and outer layers comprise different materials. The inner layer is resiliently stretchable so that the inner layer and the bottom section conform to contours of the hand and frictionally engage the glove to the hand. The outer layer prevents a bee from contacting the medial layer and the medial layer prevents the bee's stinger from reaching the inner layer.

11 Claims, 5 Drawing Sheets

(56) References Cited

U.S. PATENT DOCUMENTS

| | | | | |
|---|---|---|---|---|
| 4,395,781 A * | 8/1983 | Myers | A01K 55/00 | 2/84 |
| 4,422,184 A * | 12/1983 | Myers | A01K 55/00 | 2/84 |
| 4,685,152 A * | 8/1987 | Heare | A41D 13/001 | 2/84 |
| 4,716,594 A * | 1/1988 | Shannon | A41D 31/04 | 2/DIG. 1 |
| 4,751,749 A * | 6/1988 | Cowhey | A41D 19/015 | 2/163 |
| 4,843,650 A * | 7/1989 | Kangas | A41F 1/06 | 2/2.5 |
| 4,901,372 A * | 2/1990 | Pierce | A41D 19/0096 | 2/21 |
| 4,985,933 A * | 1/1991 | Lemoine | A41D 13/001 | 2/84 |
| 5,054,126 A * | 10/1991 | Rivkin | A41F 1/06 | 2/DIG. 2 |
| 5,070,540 A * | 12/1991 | Bettcher | A41D 19/0058 | 2/48 |
| 5,091,993 A * | 3/1992 | Merrill | A42B 1/046 | 2/202 |
| 5,113,532 A * | 5/1992 | Sutton | D02G 3/404 | 2/48 |
| 5,150,476 A * | 9/1992 | Statham | A41D 31/085 | 2/81 |
| 5,243,706 A * | 9/1993 | Frim | A41D 13/0025 | 2/81 |
| 5,244,716 A * | 9/1993 | Thornton | A41D 31/102 | 2/243.1 |
| 5,249,307 A * | 10/1993 | Lemoine | A41D 13/02 | 2/84 |
| 5,274,849 A * | 1/1994 | Grilliot | A62B 17/003 | 428/920 |
| 5,341,511 A * | 8/1994 | Wells | A41D 13/001 | 2/243.1 |
| 5,357,635 A * | 10/1994 | Lemoine | A41D 13/001 | 2/84 |
| 5,452,478 A * | 9/1995 | Rombach | A41D 19/01505 | 2/166 |
| 5,564,127 A * | 10/1996 | Manne | A41D 19/0096 | 2/167 |
| 5,600,850 A * | 2/1997 | Shannon | A41D 13/001 | 2/69 |
| 5,650,225 A * | 7/1997 | Dutta | D06N 3/183 | 428/36.1 |
| 5,720,047 A * | 2/1998 | Spitzer | A63B 71/148 | 2/161.1 |
| 5,740,551 A * | 4/1998 | Walker | A41D 31/102 | 2/167 |
| 5,745,919 A * | 5/1998 | Kraatz | A41D 19/01505 | 2/163 |
| 5,822,791 A * | 10/1998 | Baris | B32B 5/26 | 2/2.5 |
| 5,894,602 A * | 4/1999 | Smith | A41F 1/06 | 2/167 |
| 5,911,313 A * | 6/1999 | Gold | A41D 19/00 | 2/164 |
| 5,941,186 A * | 8/1999 | Argentino | B32B 27/08 | 2/81 |
| 6,021,524 A * | 2/2000 | Wu | A41D 19/0096 | 2/167 |
| 6,145,348 A * | 11/2000 | Hardegree | D04B 27/06 | 66/196 |
| 6,263,511 B1 * | 7/2001 | Moretti | A41D 31/102 | 2/93 |
| 6,457,182 B1 * | 10/2002 | Szczesuil | A41D 19/01511 | 2/167 |
| 6,728,969 B2 * | 5/2004 | Zeiler | A01K 55/00 | 2/4 |
| 6,802,082 B2 * | 10/2004 | Watley | A41D 13/001 | 428/17 |
| 7,080,412 B2 * | 7/2006 | Zeiler | A41D 13/001 | 2/455 |
| 7,200,870 B1 * | 4/2007 | Kolk | A41D 13/08 | 2/167 |
| 7,237,272 B2 * | 7/2007 | Botcher | A41D 31/24 | 2/259 |
| 7,636,955 B2 * | 12/2009 | Plut | A62D 5/00 | 2/457 |
| 9,398,779 B2 * | 7/2016 | Turner | A63B 71/1225 | |
| 9,510,628 B2 * | 12/2016 | Ragan | A41D 19/01529 | |
| 9,629,402 B2 * | 4/2017 | Albertyn | A41D 19/01505 | |
| D802,221 S * | 11/2017 | Piotrowski | D29/117.1 | |
| 9,828,707 B2 * | 11/2017 | Patton | B32B 5/06 | |
| 10,060,708 B2 * | 8/2018 | Andresen | A41D 13/018 | |
| 10,143,248 B2 * | 12/2018 | Hull | A41D 19/01517 | |
| 10,905,177 B2 * | 2/2021 | Iriarte Tineo | A41D 27/24 | |
| 11,419,369 B1 * | 8/2022 | Duke | A41D 31/245 | |
| 11,793,254 B2 * | 10/2023 | Tryner | A41D 19/015 | |
| 12,035,771 B2 * | 7/2024 | Polegato Moretti | A41D 31/102 | |
| 2002/0124293 A1 * | 9/2002 | Zeiler | A41D 13/001 | 2/4 |
| 2002/0162161 A1 * | 11/2002 | Zeiler | A01K 55/00 | 2/84 |
| 2003/0196247 A1 * | 10/2003 | Hellriegel | B25J 21/02 | 2/159 |
| 2004/0181848 A1 * | 9/2004 | Jaunault | A41D 19/0003 | 2/161.6 |
| 2005/0278837 A1 * | 12/2005 | Wallerstein | A41D 13/001 | 2/456 |
| 2006/0143767 A1 * | 7/2006 | Yang | B32B 27/40 | 442/76 |
| 2007/0083980 A1 * | 4/2007 | Yang | A41D 19/0068 | 2/167 |
| 2007/0113317 A1 * | 5/2007 | Garneau | A41D 19/01523 | 2/161.1 |
| 2007/0134486 A1 * | 6/2007 | Bansal | A41D 31/305 | 428/318.4 |
| 2009/0210992 A1 * | 8/2009 | Duhatschek | A41D 19/01511 | 2/167 |
| 2010/0186144 A1 * | 7/2010 | Zhu | D02G 3/185 | 2/167 |
| 2011/0083250 A1 * | 4/2011 | Smith | A41D 19/0044 | 2/167 |
| 2013/0283864 A1 * | 10/2013 | VanErmen | A41D 31/145 | 66/174 |
| 2015/0208745 A1 * | 7/2015 | Duhatschek | A41D 13/0543 | 2/463 |
| 2016/0029721 A1 * | 2/2016 | Sheehy | A41D 19/015 | 2/16 |
| 2017/0003104 A1 * | 1/2017 | Andresen | A41D 31/285 | |
| 2017/0143051 A1 * | 5/2017 | Patton | B32B 5/12 | |
| 2017/0143059 A1 * | 5/2017 | Gallagher | A41B 11/005 | |
| 2017/0238636 A1 * | 8/2017 | Einesson | A41D 13/08 | |
| 2017/0248391 A1 * | 8/2017 | Andresen | A41D 31/245 | |
| 2020/0048801 A1 * | 2/2020 | McCord | D04B 1/24 | |
| 2020/0087512 A1 * | 3/2020 | Chang | A43B 13/04 | |
| 2020/0345085 A1 * | 11/2020 | Iriarte Tineo | A41D 27/24 | |
| 2021/0015188 A1 * | 1/2021 | Kozuki | D06N 3/08 | |
| 2021/0321700 A1 * | 10/2021 | Trevino | A41D 31/30 | |
| 2022/0234336 A1 * | 7/2022 | Baychar | B32B 5/024 | |
| 2023/0337769 A1 * | 10/2023 | Kariyapperuma | C09D 7/65 | |
| 2024/0138501 A1 * | 5/2024 | Heyd | A41D 19/0006 | |

* cited by examiner

HAND PROTECTION DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to protection devices and more particularly pertains to a new protection device for preventing bee stings. The present invention discloses a protection device comprising a form fitting glove having a three layered top section that prevents a bee from stinging a wearer of the glove while ensuring a tight fit to improve dexterity of the glove.

(2) Description of Related Art Including Information Disclosed Under 37 CFR 1.97 and 1.98

The prior art relates to protection device, which may comprise gloves having internal screens for holding bees away from a hand in such a glove.

Related prior art comprises garments made of netting and having a plurality of protrusions to hold the netting away from skin of a wearer, garments comprising inner and outer layers, wherein the outer layer excludes insects and the inner layer functions to hold the outer layer away from skin of a wearer, and coveralls for apiarists made from three layers of fabric, wherein a medial layer of fabric is of a thickness greater than a length of a bee's stinger. While these prior art references teach layered fabrics that separates insects from skin of a wearer, there is no suggestion that such materials would be suitable for use in gloves and such materials typically would not provide a glove allowing hand movements required for efficiently performing beekeeping tasks.

What is lacking in the prior art is a protection device comprising a glove having a top section comprising inner, outer, and medial layers wherein the inner and outer layers comprise a different material. The inner layer is resiliently stretchable so that the inner layer and a bottom section of the glove conform to contours of the hand and frictionally engage the glove to the hand. The outer layer prevents a bee from contacting the medial layer and the medial layer prevents the bee's stinger from reaching the inner layer. The present invention teaches fabrics and constructions being different relative to the prior art.

BRIEF SUMMARY OF THE INVENTION

An embodiment of the disclosure meets the needs presented above by generally comprising a glove, which is configured to be donned by a user by insertion of a respective hand into an opening that is positioned in the glove to removably engaged the glove to the respective hand. The glove comprises a bottom section and a top section, which are positioned, upon donning of the glove, over a palm and a back of the respective hand, respectively, and over lower portions and upper portions of each finger, respectively. The top section comprises an inner layer, an outer layer, and a medial layer, which is positioned between the inner layer and the outer layer. The inner layer is resiliently stretchable so that the inner layer and the bottom section are configured to conform to contours of the respective hand and to frictionally engage the glove to the respective hand. The outer layer is configured to prevent a bee from contacting the medial layer and the medial layer is configured to prevent a stinger of the bee from reaching the inner layer.

Another embodiment of the disclosure includes a method for preventing bee stings to a hand comprising a provision step, which entails providing a hand protection device according to the disclosure above. A first operational step of the method is donning the glove. A second operational step of the method is performing a beekeeping task.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
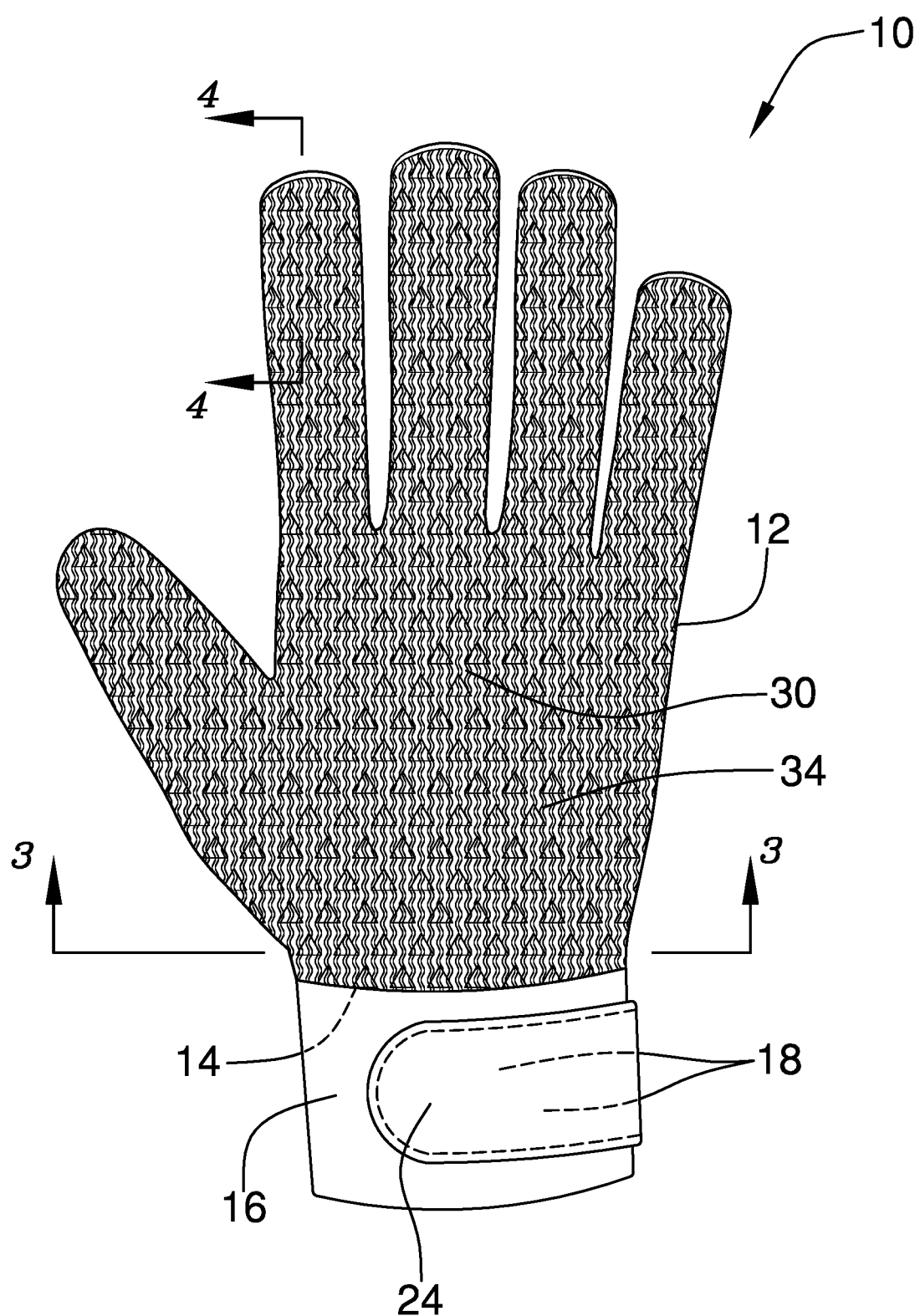
FIG. 1 is a top view of a hand protection device according to an embodiment of the disclosure.
Figure 2:
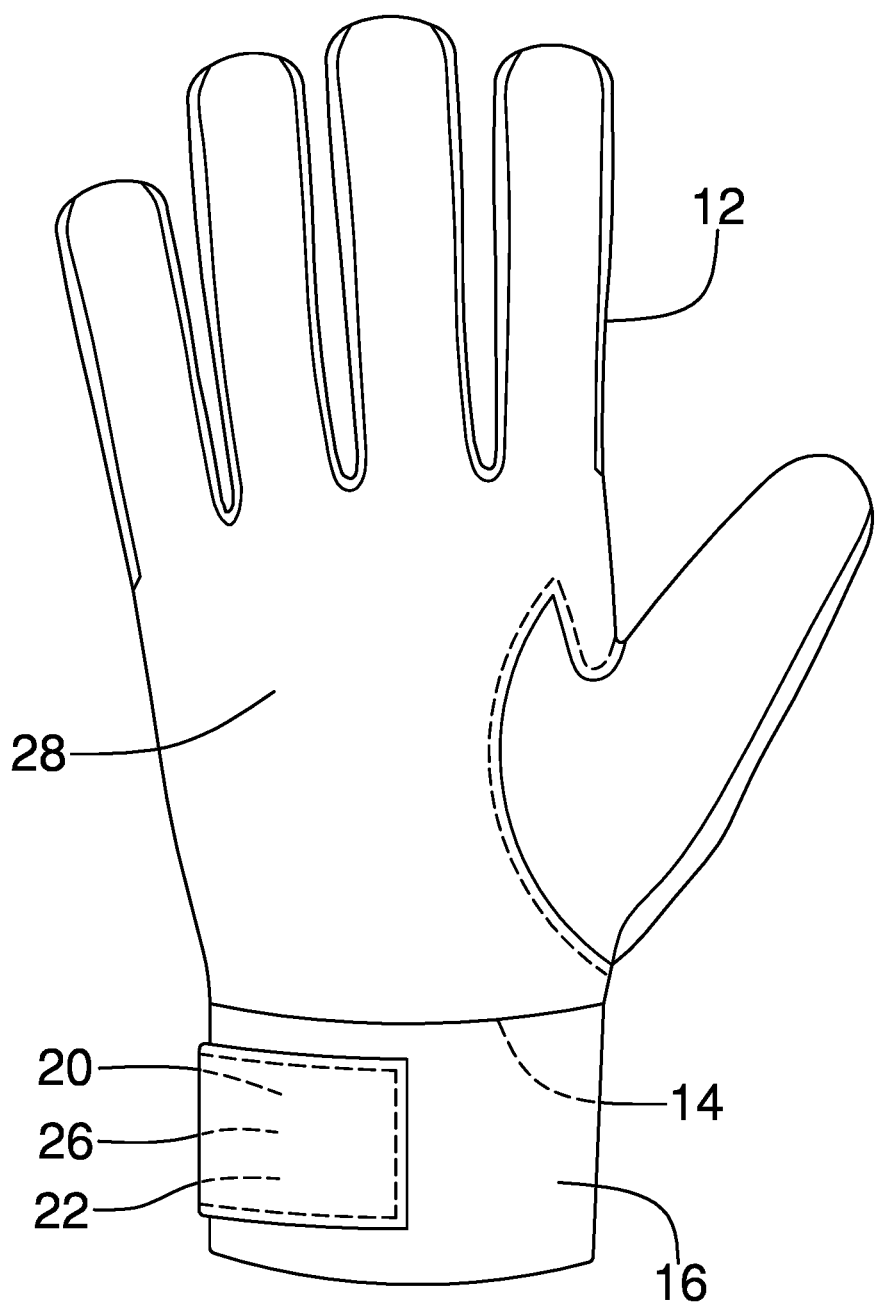
FIG. 2 is a bottom view of an embodiment of the disclosure.

With reference now to the drawings, and in particular to FIGS. 1 through 6 thereof, a new protection device embodying the principles and concepts of an embodiment of the disclosure and generally designated by the reference numeral 10 will be described.

As best illustrated in FIGS. 1 through 6, the hand protection device 10 generally comprises a glove 12, which is configured to be donned by a user by insertion of a respective hand into an opening 14 that is positioned in the glove 12 to removably engaged the glove 12 to the respective hand. A cuff 16 is attached to the glove 12 and extends circumferentially around the opening 14 in the glove 12. A pair of fasteners 18 may be attached to the cuff 16, the fasteners 18 of which are selectively mutually couplable. The cuff 16, in some embodiments, is configured to be tightened around a wrist of the user, positioning the fasteners 18 to be mutually coupled to secure the glove 12 to the respective hand. The present invention also anticipates the cuff 16 extending up a forearm of the user, which would, as will become apparent, provide protection from bee stings to the forearm.

The pair of fasteners 18 may comprise a first element 20 of a hook and loop fastener 22, which is attached to the cuff 16, and a strap 24, which is attached to and which extends from the cuff 16. A second element 26 of the hook and loop fastener 22 is attached to the strap 24. The strap 24 is configured to be grasped in digits of a hand of the user, positioning the user to pull on the strap 24 to tighten the cuff 16 and to attach the second element 26 to the first element 20 to secure the cuff 16 in a tightened configuration around the wrist of the user. Other fastening means are anticipated for tightening the cuff 16 to the wrist of the user, such as, but not limited to, elastic banding, buckle straps, and the like.

The glove 12 comprises a bottom section 28 and a top section 30, which are positioned, upon donning of the glove 12, over a palm and a back of the respective hand, respectively, and over lower portions and upper portions of each finger, respectively. The top section 30 comprises an inner layer 32, an outer layer 34, and a medial layer 36, which is positioned between the inner layer 32 and the outer layer 34. Typically, the inner layer 32 and the outer layer 34 are comprised of different materials relative to each other. The inner layer 32 is resiliently stretchable so that the inner layer 32 and the bottom section 28 are configured to conform to contours of the respective hand and to frictionally engage the glove 12 to the respective hand. The outer layer 34 is configured to prevent a bee from contacting the medial layer 36 and the medial layer 36 is configured to prevent a stinger of the bee from reaching the inner layer 32, and thereby preventing the user from being stung.

The outer layer 34 may be meshed and thus configured to allow for passage of air to vent the glove 12. The present invention also anticipates a plurality of cutouts 38, which is positioned in the medial layer 36. The medial layer 36 thereby also is configured to allow for passage of air to vent the glove 12. The cutouts 38 may be of any shape, for example, rectangular, circular, hexagonal, or the like.

Figure 3:
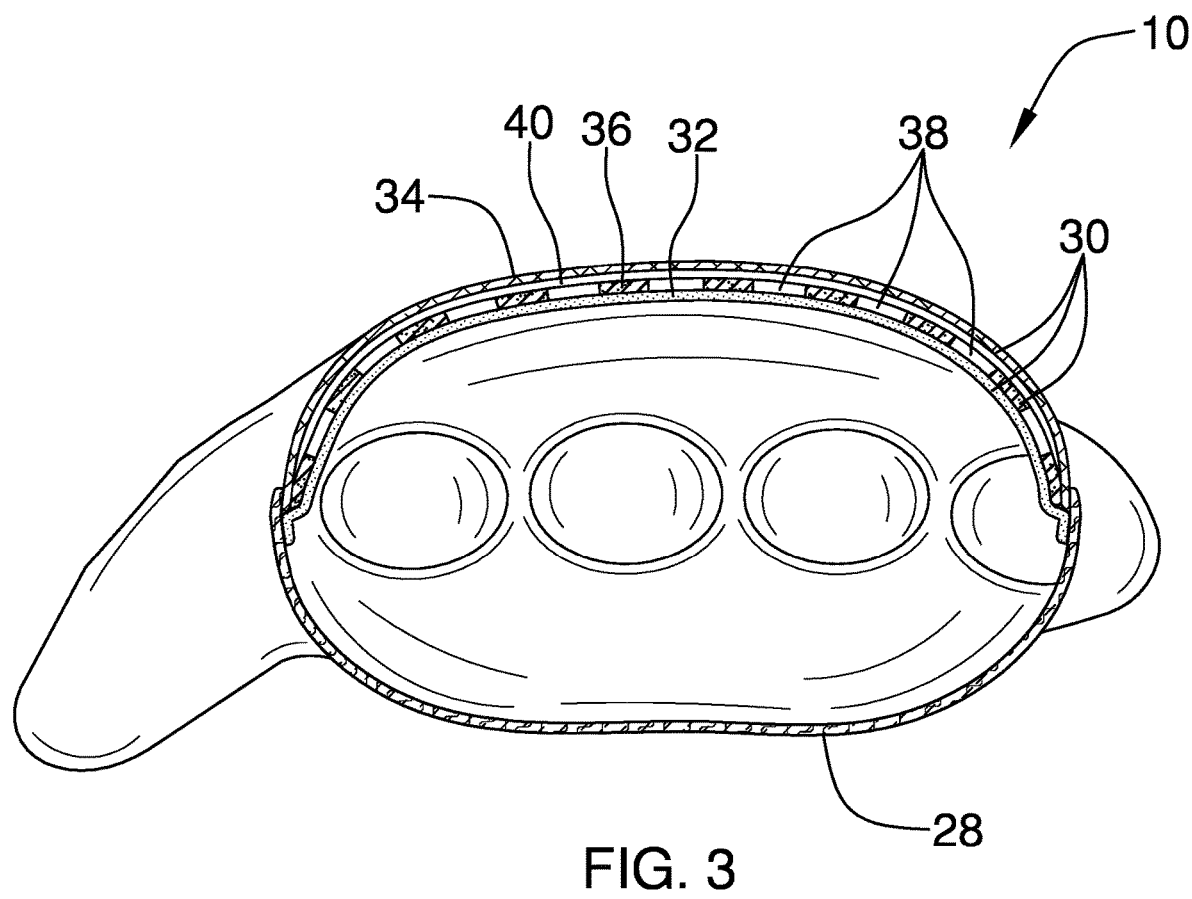
FIG. 3 is a cross-sectional view of an embodiment of the disclosure.
Figure 4:
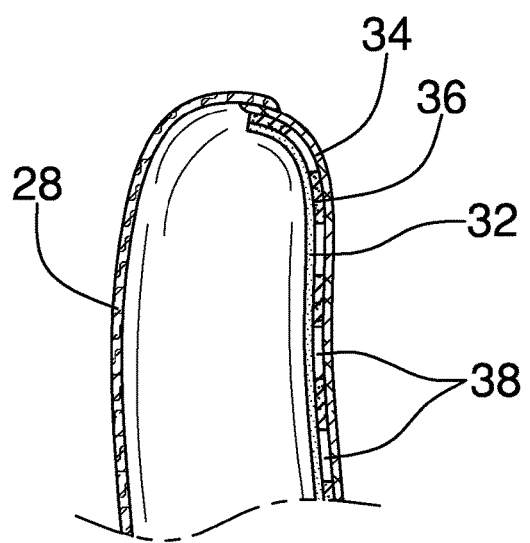
FIG. 4 is a cross-sectional view of an embodiment of the disclosure.
Figure 5:
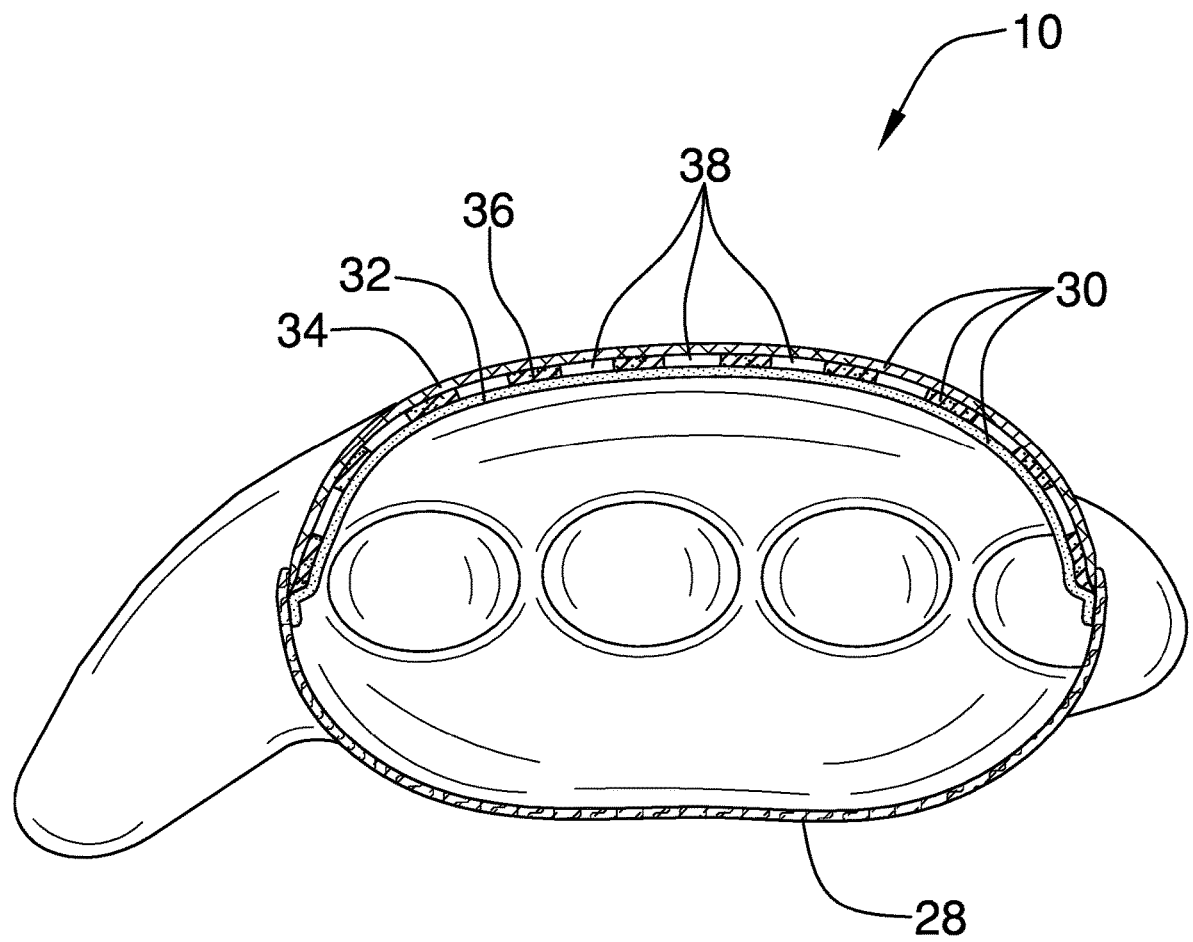
FIG. 5 is a cross-sectional view of an embodiment of the disclosure.
Figure 6:
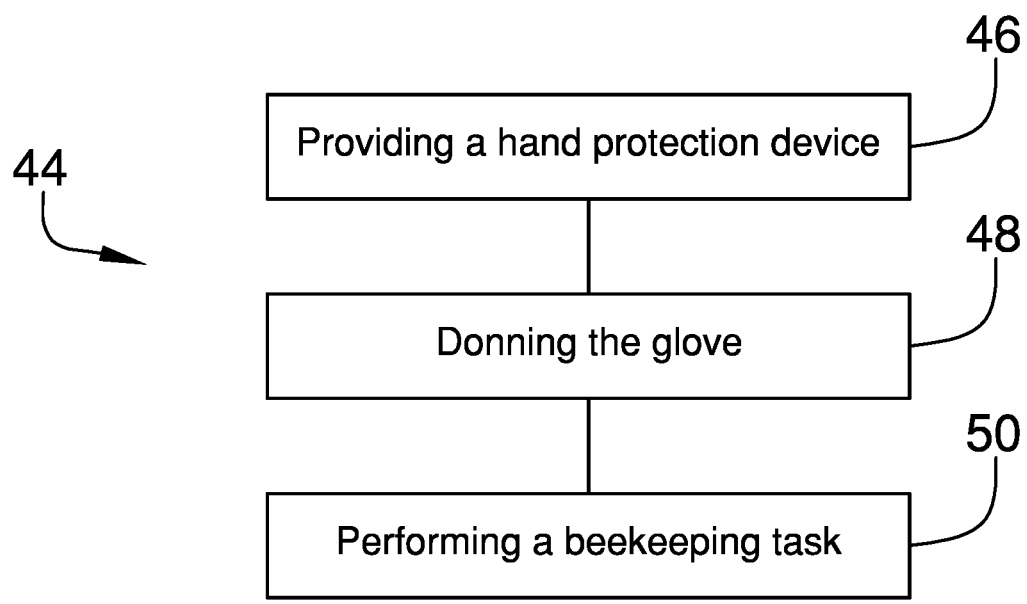
FIG. 6 is a flow diagram for a method utilizing an embodiment of the disclosure.

In one configuration, as is shown in FIG. 3, the outer layer 34 is separated from the medial layer 36 so that the outer layer 34 and the medial layer 36 define a gap 40, which further separates the inner layer 32 from a bee positioned on the outer layer 34. In another configuration, the medial layer 36 is attached to one or both of the inner layer 32 and the outer layer 34. As is shown in FIGS. 4 and 5, the medial layer 36 is attached to both the outer layer 34 and the inner layer 32. Attachment of the medial layer 36 to one or both of the inner layer 32 and the outer layer 34 may be performed by methods known to those skilled in the art of layer bonding using methods such as, but not limited to, adhesive methods, stitching methods, and the like.

The present invention anticipates one or both of the outer layer 34 and the medial layer 36 being resiliently stretchable, as might be required with the medial layer 36 being attached to one or both of the inner layer 32 and the outer layer 34. One or more of the outer layer 34, the inner layer 32, and the medial layer 36 may comprise elastomer. For example, the inner layer 32 and the outer layer 34 may comprise one or more of a polyester, a polyether-polyurea copolymer, a polyacrylonitrile, a polyamide, or the like. The medial layer 36 may comprise a synthetic rubber, such as, but not limited to, chloroprene rubber, styrene-butadiene rubber, polyisoprene rubber, nitrile rubber, or the like, as well as natural rubber, silicone, or the like. The bottom section 28 may comprise leather, faux leather, or the like. In one configuration, the bottom section 28 comprises goat skin.

The medial layer 36 has a thickness 42 greater than or equal to 1.60 mm, which is sufficient to prevent penetration of a stinger of a honeybee, which has an average length of 1.62 mm. In some embodiments, the medial layer 36 may have a thickness 42 of from 2.00 to 8.00 mm.

In one embodiment, the inner layer 32 will have a stretch percentage that is greater than a stretch percentage of the outer layer 34, and, typically, a stretch percentage of the medial layer 36. Stretch percentage is a common term used in the textile arts to define the relative amount a textile can be stretched before returning to its original size. The inner layer 32 will typically have a stretch percentage greater than 30% in both a length and a width direction. This will ensure that the inner layer 32 will conform to and fit tightly against the hand of the wearer. Forming a tight fit will ensure that the wearer's fingers are retained properly within finger sleeves of the glove 12, which will increase the wearer's finger dexterity while performing beekeeping duties.

In a particular example, which is not limiting, the outer layer 34 comprises 95% polyester and 5% polyether-polyurea copolymer and, being meshed, has a fabric weight of 210 g/m$^2$. The medial layer 36 in this example comprises chloroprene rubber and has a thickness 42 of 5.0 mm. The inner layer 32 in this example comprises 85% polyester and 15% polyether-polyurea copolymer, is breathable, and has a fabric weight of 186 g/m$^2$. The bottom section 28 comprises goat skin, though other bee stinger impervious materials may be utilized. The glove 12 thus produced was comfortable, allowed for dexterous hand movements, and prevented bee stings while simultaneously ensuring air flow across the back of the wearer's hand to prevent sweating within the glove 12.

In use, the hand protection device 10 enables a method for preventing bee stings to a hand 44 comprising a provision step 46, which entails providing a hand protection device 10 according to the specification above. A first operational step 48 of the method 44 is donning the glove 12. A second operational step 50 of the method 44 is performing a beekeeping task. It is further anticipated that the bee sting protection provided by the top section 30 can be applied to other body parts, such as a torso and arms by means of a jacket, to legs and pelvic areas by means of pants, or to a torso, arms, legs, and pelvic area by means of coveralls. Hoods constructed as per the top section 30 could provide bee sting protection to a head of the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand protection device comprising a glove configured for being donned by a user by insertion of a respective hand into an opening positioned in the glove, such that the glove is removably engaged to the respective hand, the glove comprising:
   a bottom section positioned over a palm of the respective hand and lower portions of each finger of the respective hand upon donning of the glove;
   a top section positioned over a back of the respective hand and upper portions of each finger upon donning of the glove, the top section comprising:
      an inner layer, the inner layer being resiliently stretchable, wherein the inner layer and the bottom section are configured for conforming to contours of the respective hand and for frictionally engaging the glove to the respective hand;
      an outer layer, said outer layer comprising a different material than said inner layer;
      a medial layer positioned between the inner layer and the outer layer, wherein the outer layer is configured for preventing a bee from contacting the medial layer and wherein the medial layer is configured for preventing a stinger of the bee from reaching the inner layer; and
      a plurality of cutouts positioned in the medial layer, wherein the medial layer is configured for passage of air for venting the glove;
   wherein one or both of the outer layer and the medial layer are resiliently stretchable, wherein one or more of the outer layer, the inner layer, and the medial layer comprise elastomer;
   wherein the inner layer and the outer layer comprise a polyester and a polyether-polyurea copolymer, respectively; and
   wherein the medial layer comprises chloroprene rubber.

2. The hand protection device of claim 1, further including a cuff attached to the glove and extending circumferentially around the opening in the glove.

3. The hand protection device of claim 2, further including a pair of fasteners being attached to the cuff, the fasteners being selectively mutually couplable, wherein the cuff is configured for being tightened around a wrist of the user and positioning the fasteners for mutually coupling for securing the glove to the respective hand.

4. The hand protection device of claim 3, wherein the pair of fasteners comprises:
   a first element of a hook and loop fastener attached to the cuff;
   a strap attached to and extending from the cuff; and
   a second element of the hook and loop fastener attached to the strap, wherein the strap is configured for grasping in digits of a hand of the user, positioning the user for pulling on the strap for tightening the cuff and for attaching the second element to the first element for securing the cuff in a tightened configuration around the wrist of the user.

5. The hand protection device of claim 1, wherein the outer layer is meshed, wherein the outer layer is configured for passage of air for venting the glove.

6. The hand protection device of claim 1, wherein the medial layer is attached to one or both of the inner layer and the outer layer.

7. The hand protection device of claim 1, wherein the bottom section comprises leather.

8. The hand protection device of claim 1, wherein the bottom section comprises goat skin.

9. The hand protection device of claim 8, wherein the medial layer has a thickness of from 2.00 to 8.00 mm.

10. The hand protection device of claim 1, wherein the medial layer has a thickness greater than or equal to 1.60 mm.

11. The hand protection device of claim 1, wherein said inner layer has stretch percentage being greater than a stretch percentage of the outer layer.

* * * * *